(12) United States Patent
Yamada

(10) Patent No.: US 12,056,544 B2
(45) Date of Patent: Aug. 6, 2024

(54) PRINTER DRIVER FOR PROCESSING PDL DATA AND REPLACEMENT PROCESSING IMAGE FORMING APPARATUS, CONTROL METHOD OF IMAGE FORMING APPARATUS, AND STORAGE MEDIUM

(71) Applicant: CANON KABUSHIKI KAISHA, Tokyo (JP)

(72) Inventor: Michihiko Yamada, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/323,728

(22) Filed: May 25, 2023

(65) Prior Publication Data
US 2023/0297798 A1    Sep. 21, 2023

Related U.S. Application Data

(62) Division of application No. 17/572,728, filed on Jan. 11, 2022, now Pat. No. 11,704,519.

(30) Foreign Application Priority Data

Feb. 4, 2021   (JP) ................. 2021-016502

(51) Int. Cl.
*G06K 15/02* (2006.01)
*G06K 15/12* (2006.01)

(52) U.S. Cl.
CPC ........ *G06K 15/1811* (2013.01); *G06K 15/129* (2013.01); *G06K 15/1802* (2013.01); *G06K 15/1836* (2013.01)

(58) Field of Classification Search
None
See application file for complete search history.

(56) References Cited

U.S. PATENT DOCUMENTS

| 2004/0051887 | A1 | 3/2004 | Nishide et al. |
| 2013/0100470 | A1 | 4/2013 | Kumagai |
| 2016/0094759 | A1 | 3/2016 | Miyanaga |
| 2019/0052774 | A1 | 2/2019 | Oka |
| 2020/0097783 | A1* | 3/2020 | Inoue ............. G06K 15/1849 |

(Continued)

FOREIGN PATENT DOCUMENTS

| CN | 103067638 A | 4/2013 |
| EP | 3726826 A1 | 10/2020 |

(Continued)

OTHER PUBLICATIONS

Office Action issued in U.S. Appl. No. 17/572,728 mailed Dec. 8, 2022.

(Continued)

*Primary Examiner* — Andrew H Lam
(74) *Attorney, Agent, or Firm* — ROSSI, KIMMS & McDOWELL LLP

(57) ABSTRACT

In a case where image data for which brief spot color matching has been performed is stored by a BOX function, it is not possible to output the image data in correct color on a condition that the image data is transmitted to another device as it is. In a case where image data is stored by the BOX function, in a printer driver that generates PDL data therefor, a color matching method of type accompanied by the brief spot color matching is not allowed to be set.

5 Claims, 13 Drawing Sheets

(56) References Cited

U.S. PATENT DOCUMENTS

2020/0204704 A1\* 6/2020 Nagasaka .......... H04N 1/40012
2021/0133521 A1   5/2021 Wilson et al.

FOREIGN PATENT DOCUMENTS

| JP | 2003348366 A | 12/2003 |
| JP | 2004090423 A | 3/2004 |
| JP | 2012000918 A | 1/2012 |
| JP | 2015109512 A | 6/2015 |
| JP | 2016213646 A | 12/2016 |
| JP | 2020175597 A | 10/2020 |

OTHER PUBLICATIONS

Notice of Allowance issued in U.S. Appl. No. 17/572,728 mailed Mar. 21, 2023.
Office Action issued in Chinese Appln. No. 202210100103, mailed Apr. 19, 2024. English translation provided.
Li. "Research and Application of Color Management in the Process of Flat Output" 2013, pp. 1-2. Cited in NPL 1.

\* cited by examiner

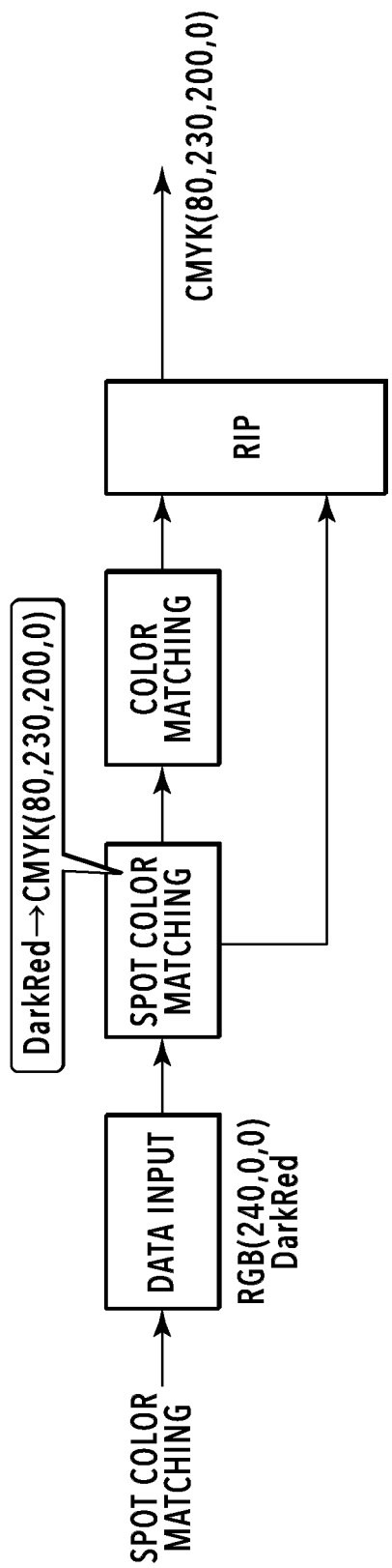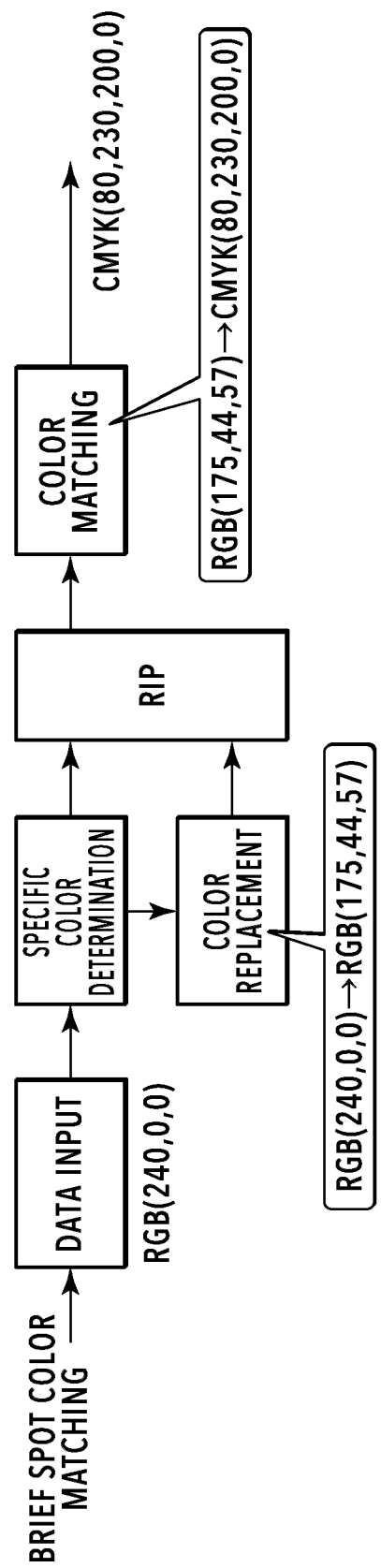

FIG.12A

There is a possibility that the tint will change in a case where this data is transmitted to another device because spot color matching processing has been applied to this data. Do you transmit the data?

[Abort] [OK]

FIG.12B

You cannot transmit this data to another device because spot color matching processing has been applied to this data.

[OK]

PRINTER DRIVER FOR PROCESSING PDL DATA AND REPLACEMENT PROCESSING IMAGE FORMING APPARATUS, CONTROL METHOD OF IMAGE FORMING APPARATUS, AND STORAGE MEDIUM

BACKGROUND

Field

The technique of the present disclosure relates to a color adjustment technique of image data.

Description of the Related Art

Some so-called MFPs (Multi-Function-Printers) comprise a function (BOX function) to store image data that is used for printing and a function (SEND function) to transmit stored image data to an external device, in addition to the basic print and copy functions. Japanese Patent Laid-Open No. 2004-090423 has disclosed a technique to warn a user that printing is not possible or the tint will change in a case where so-called bookbinding printing is performed by using a plurality of pieces of image data stored by the BOX function and on a condition that the color space of the plurality of pieces of image data is different.

There is a technique called spot color matching in which a color name (for example, Dark RED and the like) is attached to a specific color that is used for a company logo or the like so that it is possible to reproduce a specific color, such as a corporate color, at the time of printing and the destination color is output by designating the color name at the time of printing (see FIG. 1A). Further, as a technique to perform spot color matching more simply, there is a technique to perform normal color matching after replacing the color values (RGB values) of a specific color included in printing-target image data with the color values (RGB values) of the destination color by suing a color replacement list prepared in advance (see FIG. 1B). In the following, this technique is called "brief spot color matching".

Here, it is assumed that the image data in the RGB color space, whose color values have been replaced for a specific color by the brief spot color matching, is stored by the above-described BOX function. In a case where the image data thus stored is transmitted to a PC or another printer, the color values (RGB values) of the specific color have been changed from the original color values, and therefore, the tint is different from that of the original image data in the PC or another printer at the transmission destination. Then, in this case, the color space of the image data is not changed and remains the same before and after the transmission, and therefore, with the technique of Japanese Patent Laid-Open No. 2004-090423, which premises that the color spaces are different, it is not possible to cope with the above-described problem.

SUMMARY

The storage medium according to the technique of the present disclosure is a non-transitory computer readable storage medium storing a printer driver for causing a computer to execute processes, the processes comprising: generating PDL data; outputting the generated PDL data; and not allowing setting of, in a case where instructions to store the PDL data in an image forming apparatus capable of printing processing based on the PDL data are given as a method of the output, execution of replacement processing to replace a specific color with another color at the time of the printing processing for the PDL data to be generated in the generating.

Further features of the present disclosure will become apparent from the following description of exemplary embodiments with reference to the attached drawings.

BRIEF DESCRIPTION OF THE DRAWINGS

FIG. 1A and FIG. 1B are diagrams explaining a problem of a technique according to the present disclosure;

FIG. 12A and FIG. 12B are each a diagram showing an example of a warning display.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

Further, in each embodiment, explanation is given by taking a so-called MFP (Multi Function Printer) as an example of an image forming apparatus that forms an image by the electrophotographic method on a printing medium in accordance with printing-target input image data. However, the application range of the technique of the present disclosure is not limited to an MFP and it is possible to widely apply the technique of the present disclosure to an image forming apparatus, such as a copy machine, a laser printer, and a facsimile device, both in the monochrome/color method and in the multi-color method.

First Embodiment

<Configuration of Printing System>

Figure 2:
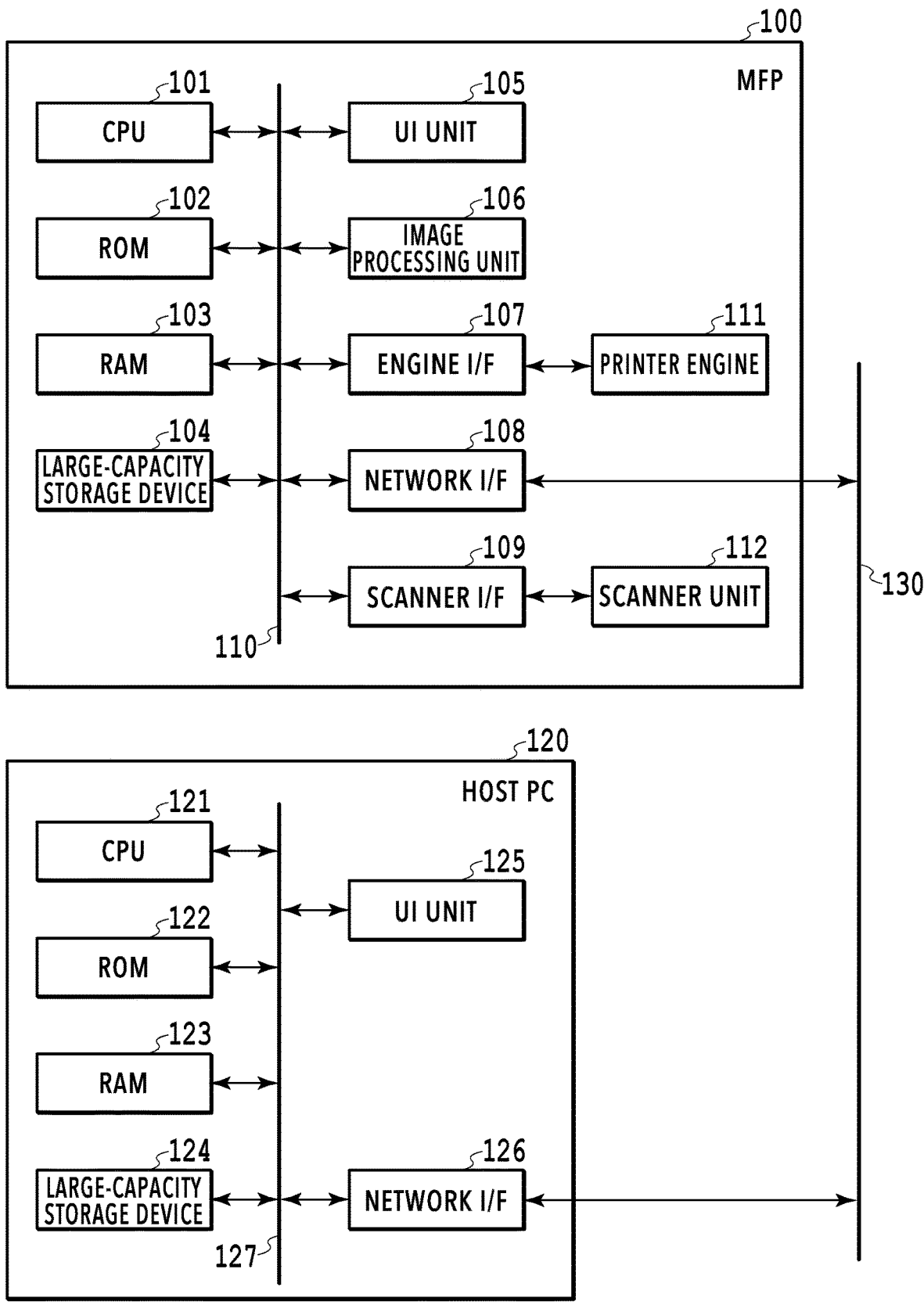
FIG. 2 is a block diagram showing a hardware configuration of a printing system.

FIG. 2 is a block diagram showing the hardware configuration of a printing system according to the present embodiment. The printing system includes an MFP 100 as an image forming apparatus and a host PC 120 as an information processing apparatus and the MFP 100 and the host PC 120 are connected via a network 130, such as a LAN.

<<Hardware Configuration of MFP>>

The MFP 100 comprises a CPU 101, a ROM 102, a RAM 103, a large-capacity storage device 104, a UI unit 105, an image processing unit 106, an engine interface (I/F) 107, a network I/F 108, and a scanner I/F 109. Each of these units is connected to one another via a system bus 110. Further, the MFP 100 comprises a printer engine 111 and a scanner unit 112. The printer engine 111 and the scanner unit 112 are connected to the system bus 110 via the engine I/F 107 and the scanner I/F 109, respectively. The image processing unit 106 may be configured as an image processing apparatus (image processing controller) independent of the MFP 100.

The CPU 101 controls the operation of the entire MFP 100. The CPU 101 performs various kinds of processing, to be described later, by reading programs stored in the ROM 102 onto the RAM 103 and executing the programs. The ROM 102 is a read only memory and in which a system activation program, programs for performing control of the printer engine, character data or character code information and the like are stored. The RAM 103 is a volatile random access memory and used as a work area of the CPU 101 and a temporary storage area of various kinds of data. For example, the RAM 103 is used as a storage area for storing font data additionally registered by download, image files received from an external device, and the like. The large-capacity storage device 104 is, for example, an HDD or an SSD, and in which various kinds of data are spooled and is used for storing programs, various tables, information files, image data and the like and used as a work area.

The UI (User Interface) unit 105 includes, for example, a liquid crystal display (LDC) comprising a touch panel function and displays screens for notifying a user of the setting state of the MFP 100, the situation of the processing being performed, the error state and the like. Further, the UI unit 105 receives various user instructions, such as inputs of various setting values of the MFP 100 and selection of various buttons, via a predetermined user interface screen (GUI). The UI unit 105 may separately comprise an input device, such as a hard key.

The image processing unit 106 generates image data that can be processed by the printer engine 111 by analyzing the drawing data written in PDL (in the following, called "PDL data"), which is input from the host PC 120 via the network 130. PDL is an abbreviation of Page Description Language. Further, the image processing unit 106 performs predetermined image processing also at the time of transmitting image data stored by the BOX function to an external device. Details of the image processing unit 106 will be described later.

The engine I/F 107 is an interface for controlling the printer engine 111 in accordance with instructions from the CPU 101 at the time of performing printing. Via the engine I/F 107, transmission and reception of engine control commands and the like are performed between the CPU 101 and the printer engine 111. The network I/F 108 is an interface for connecting the MFP 100 to the network 130. The network I/F 108 may be, for example, a LAN or a public switched telephone network (PSTN). The printer engine 111 forms a multi-colored image on a printing medium, such as paper, by using color materials (here, toner) in a plurality of colors (here, four colors of CMYK) based on the image data for printing provided from the image processing unit 106. The scanner I/F 109 functions as an interface for controlling the scanner unit 112 in accordance with instructions from the CPU 101 at the time of performing reading of a document by the scanner unit 112. Via the scanner I/F 109, transmission and reception of scanner unit control commands are performed between the CPU 101 and the scanner unit 112. The scanner unit 112 generates image data (scanned image data) by optically reading a document by the control by the CPU 101 and transmits the image data to the RAM 103 or the large-capacity storage device 104 via the scanner I/F 109.

<<Hardware Configuration of Host PC>>

The host PC 120 comprises a CPU 121, a ROM 122, a RAM 123, a large-capacity storage device 124, a UI unit 125, and a network I/F 126. Each of these units is connected to one another via a system bus 127. The CPU 121 is a processor that controls the operation of the entire host PC 120 and performs various kinds of processing by reading control programs and application programs stored in the ROM 122. The RAM 123 is used as a temporary storage area, such as a main memory and a work area, of the CPU 121. The large-capacity storage device 124 is, for example, an HDD or an SSD, and stores image data and the like, in addition to various programs, such as a printer driver. The UI (User Interface) unit 125 includes, for example, a liquid crystal monitor, a keyboard and the like, and is used to display various GUIs and receive user instructions. The network I/F 126 is an interface that connects the host PC 120 to the network 130. The host PC 120 transmits the PDL data generated by using the installed printer driver to the MFP 100 via the network I/F 126 and causes the MFP 100 to perform printing processing. Further, the host PC 120 receives the image data transmitted from the MFP 100 via the network I/F 126 and edits, displays the image data, and so on.

<Configuration of Printer Driver>

Figure 3:
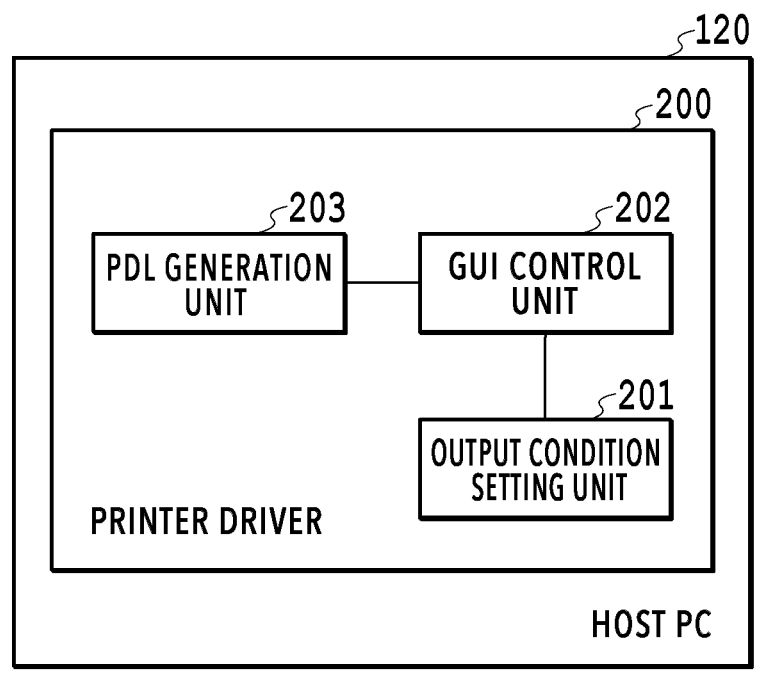
FIG. 3 is a block diagram showing a function configuration of a printer driver.

Following the above, the printer driver that is used at the time of the host PC 120 instructing the MFP 100 to perform printing is explained. FIG. 3 is a block diagram showing the function configuration of the printer driver installed in the host PC 120. A printer driver 200 comprises an output condition setting unit 201, a GUI control unit 202, and a PDL generation unit 203. Each of these function units operates on the operating system (in the following, OS) of the host PC 120.

Figure 4A:
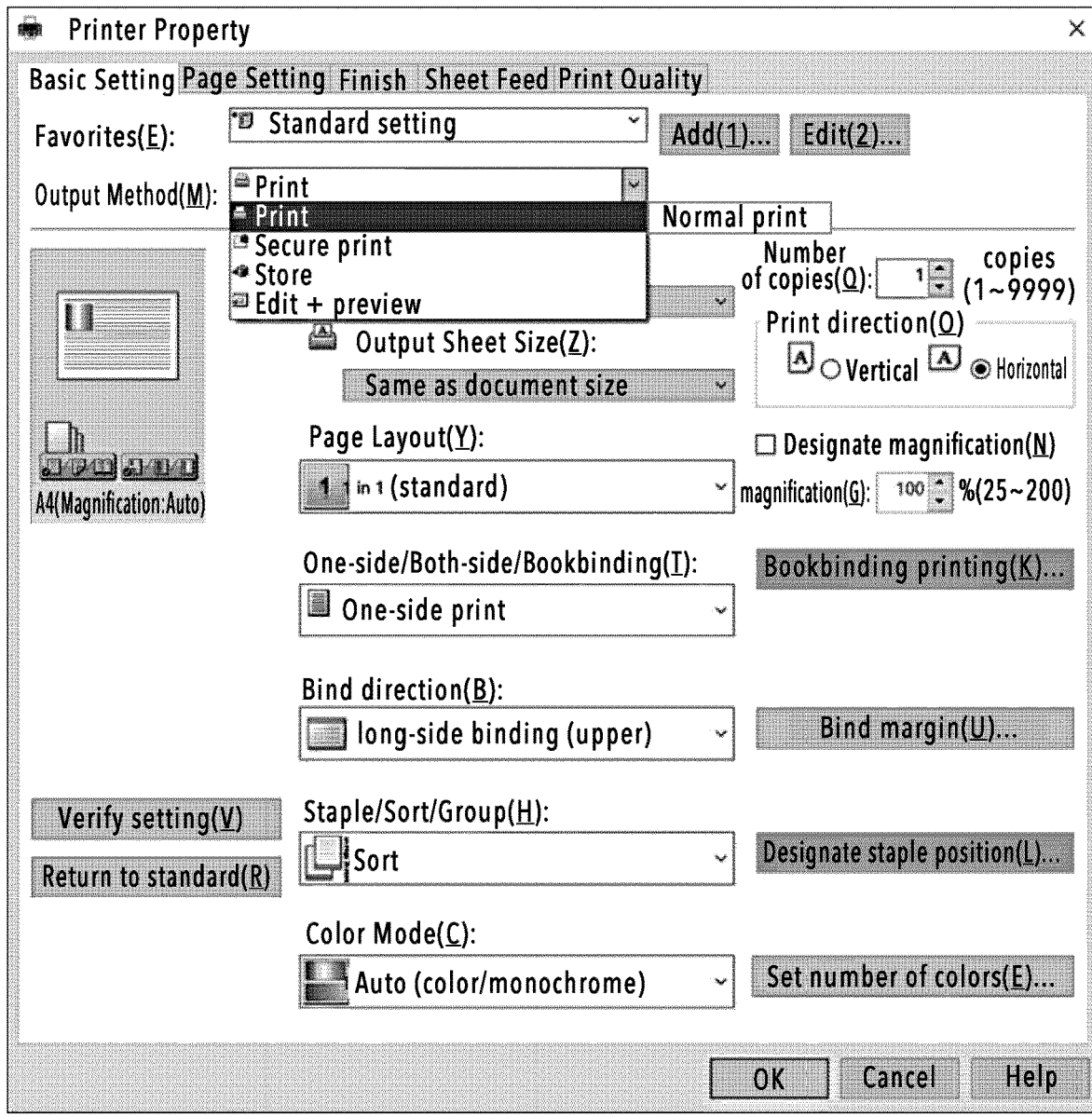
FIG. 4A and FIG. 4B are each a diagram showing an example of a GUI for giving instructions to perform output, such as printing.

The output condition setting unit 201 sets detailed conditions at the time of instructing the MFP 100 to perform output, such as printing, based on the user input via the GUI (Graphical User Interface). FIG. 4A is an example of the GUI that a user uses at the time of instructing the MFP 100 to perform output, such as printing, and here, the state where a "Basic Setting" tab is selected is shown. It is possible for a user to select and designate one from a pulldown menu ("Print", "Secure print", "Store", "Edit+preview") of "Output Method" on the GUI in FIG. 4A. The meaning of each of the four kinds of alternative of Output Method is as follows.

"Print": normal printing is performed

"Secure print": printing whose security is enhanced is performed

"Store": image data is stored in an external device (BOX storage)

"Edit+preview": image data is edited and preview-displayed

Figure 4B:
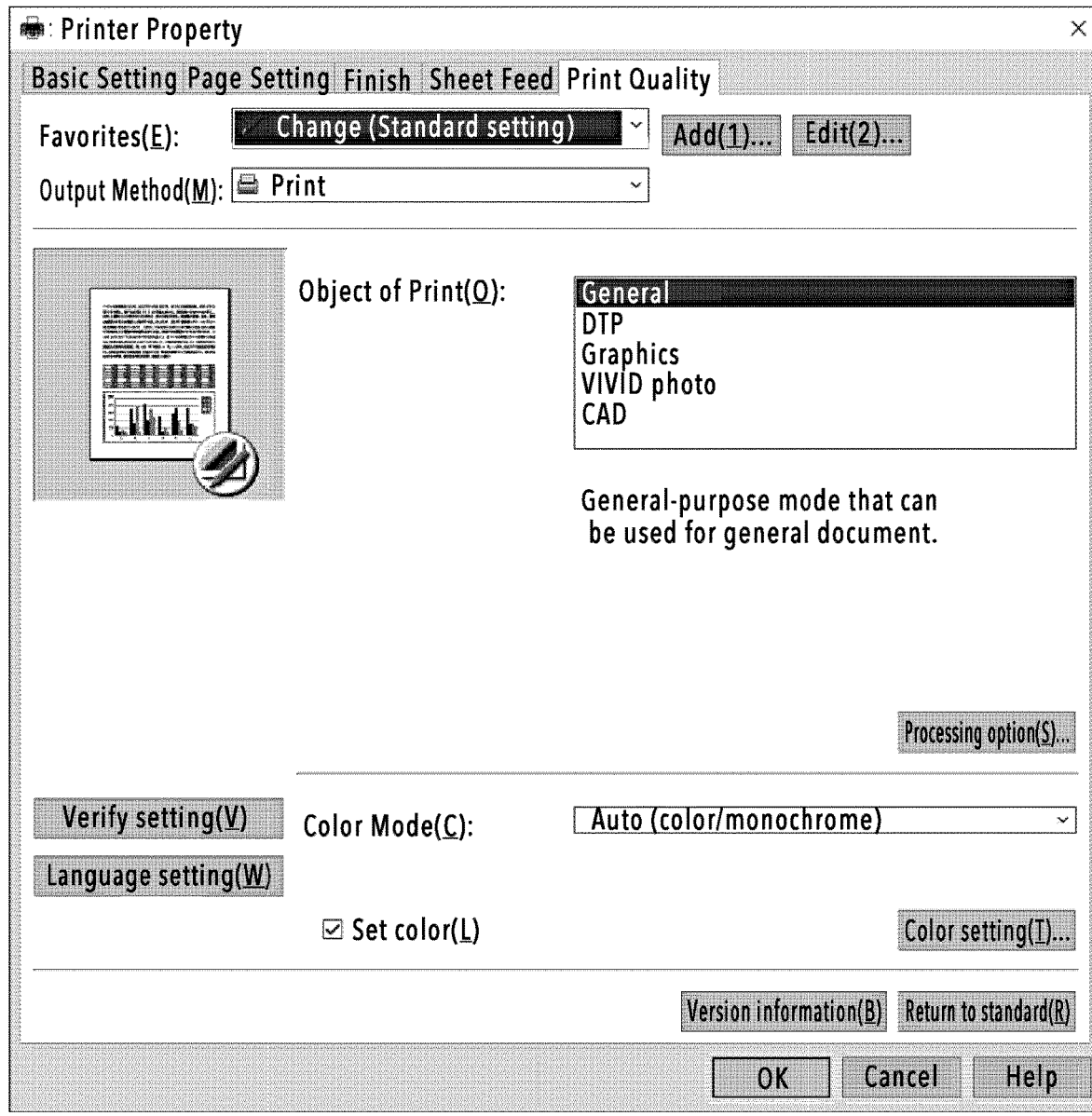
Figure 5B:
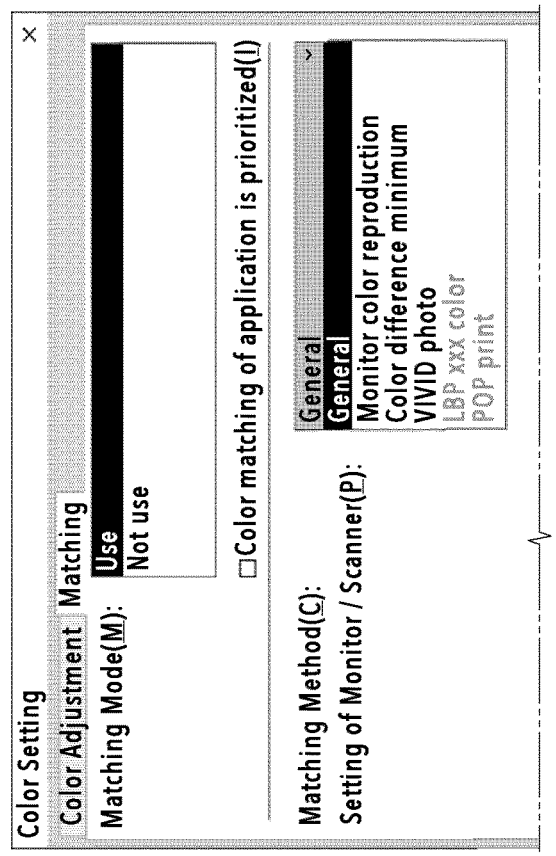
FIG. 5A and FIG. 5B are each a diagram showing an example of a GUI for color setting.
Figure 5A:
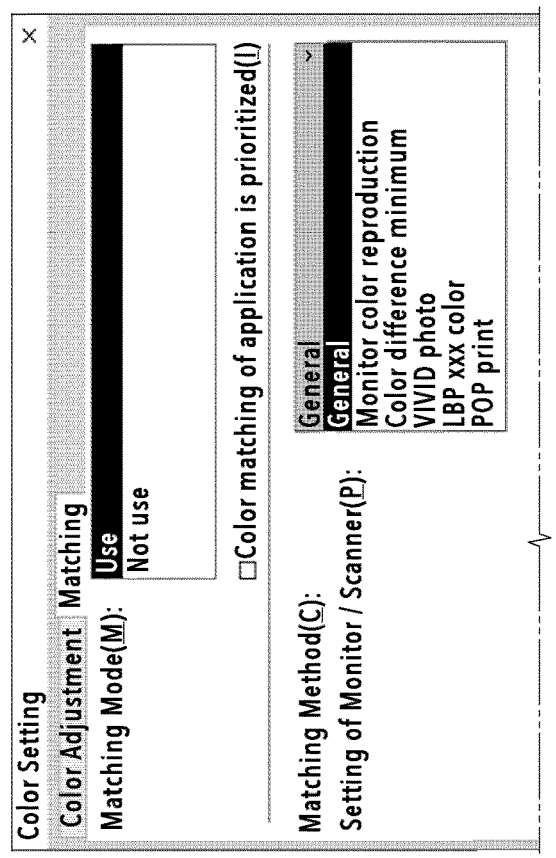

Further, for example, in a case where a user selects a "Print Quality" tab in the state in FIG. 4A described above, the GUI shown in FIG. 4B is displayed. Then, in a case where the user presses down a "Color setting" button following the above, then the GUI shown in FIG. 5A is displayed. Here, the GUI in FIG. 5A shows the state where a "Matching" tab is selected and it is possible for the user to perform detailed setting relating to color matching. Specifically, it is possible to set whether nor not to use the matching mode and the type of the matching method in a case where the matching mode is used. In the example in FIG. 5A, as the types of the matching method that can be selected, "General", "Monitor color reproduction", "Color difference minimum", "VIVID photo", "LBP xxx color", and "POP print" are displayed in a pulldown menu. These types represent the feature of a three-dimensional lookup table (in the following, described as "color conversion LUT") that is used at the time of performing color conversion processing from the RGB color space of the monitor, which is the display device, into the CMYK color space of the MFP 100 (printer engine 111), which is the output device. Then, in accordance with the type, a color replacement list used for the brief spot color matching described previously is associated. In the color replacement list, the destination color for a specific color is defined and in a case where no specific color is designated, the state is such that there is no registration of a specific color and the destination color corresponding thereto (empty state). In the present embodiment, with the two types of "LBP xxx color" and "POP print", a color replacement list in which at least one or more sets of a specific color and the destination color thereof are registered is associated. Then, with the four type of "General", "Monitor color reproduction", "Color difference minimum", and "VIVID photo", a color replacement list in which not even one set of a specific color and the destination color thereof is registered is associated. Table 1 below is an example of a color replacement list in which three sets of a specific color and the destination color thereof are registered.

TABLE 1

| Specific color | | | Destination color | | |
| --- | --- | --- | --- | --- | --- |
| R | G | B | R | G | B |
| 204 | 0 | 0 | 200 | 0 | 12 |
| 255 | 240 | 0 | 240 | 250 | 0 |
| 0 | 240 | 240 | 0 | 255 | 243 |

In Table 1 described above, the color values (RGB values) of each of the specific color and the destination color are represented by eight bits.

The GUI control unit 202 performs control of the GUI for a user to perform various kinds of setting, that is, display control of the GUI and the like in FIG. 4 and FIG. 5, which is displayed on the UI unit 125. Further, the GUI control unit 202 also performs setting limitation relating to a predetermined item within the GUI.

The PDL generation unit 203 receives drawing information on document files and the like generated by various applications via a GDI (Graphics Device Interface) prepared by the OS and generates PDL data in accordance with the contents set by the output condition setting unit 201 described previously. The generated PDL data is sent to the MFP 100 via the network I/F 126.

<Details of Image Processing Unit>

Figure 6:
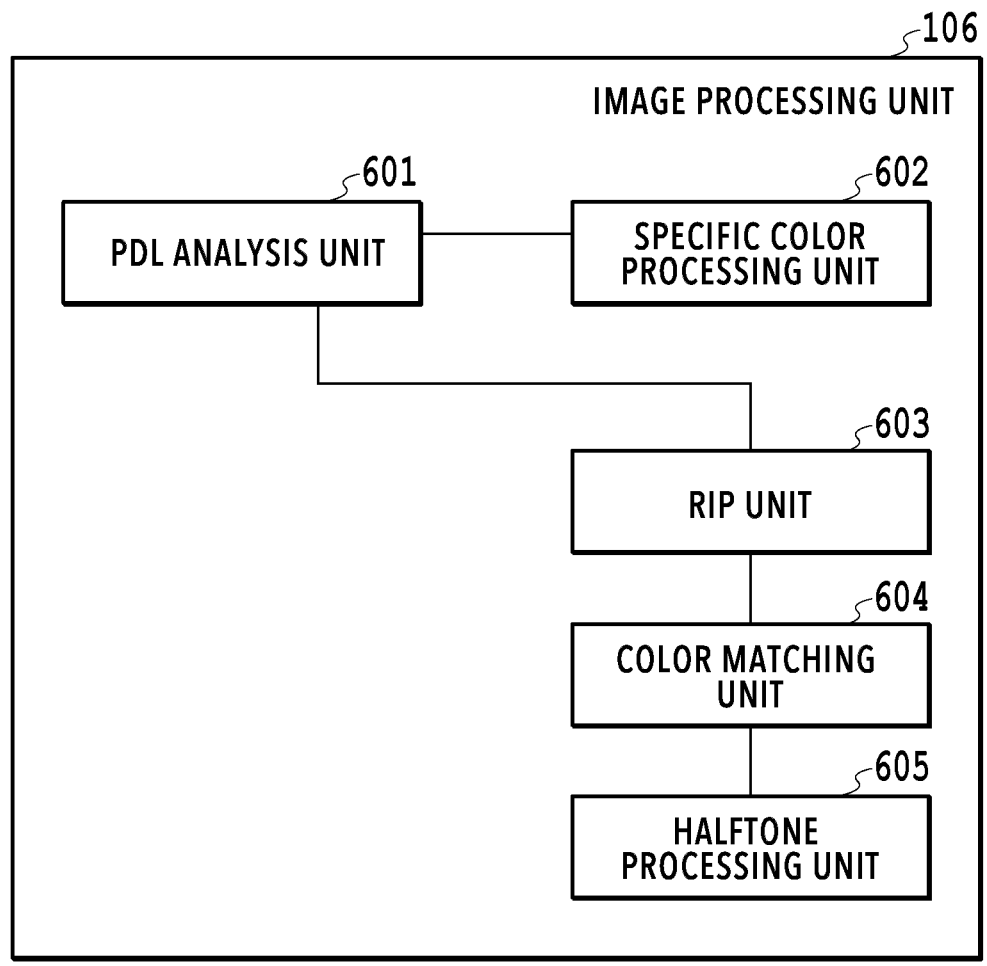
FIG. 6 is a block diagram showing an internal configuration of an image processing unit according to a first embodiment.

Next, the image processing unit 106 of the MFP 100 is explained in detail. FIG. 6 is a function block diagram showing the internal configuration of the image processing unit 106. The image processing unit 106 comprises a PDL analysis unit 601, a specific color processing unit 602, a RIP unit 603, a color matching unit 604, and a halftone processing unit 605. Each of these units is implemented by the CPU 101 reading a program stored in the ROM 102 onto the RAM 103 and executing the program.

Alternatively, part or all of the function units may be implemented by hardware, such as an ASIC or an electronic circuit. In the following, each unit is explained.

The PDL data received by the MFP 100 is stored in the RAM 103 or the large-capacity storage device 104 and input to the PDL analysis unit 601. The PDL analysis unit 601 reads the PDL data from the RAM 103 or the like and analyzes the PDL data. Then, the PDL analysis unit 601 generates control commands of the specific color processing unit 602, the RIP unit 603 and the like, to be described later, by obtaining information relating to the output conditions, such as the attribute (text, graphics, image or the like) of the drawing-target object, the color values (here, RGB values), and the color matching method.

The specific color processing unit 602 reads the color replacement list from the large-capacity storage device 104 and performs the brief spot color matching described previously. That is, in a case where the color values obtained by the PDL analysis unit 601 and the color values of the specific color registered in the color replacement list match, the specific color processing unit 602 converts the color values into the color values of the destination color associated with the specific color. In a case where none of all the color values obtained by the PDL analysis unit 601 match with the color values of the specific color registered in the color replacement list, this means that the processing-target color is not included in the printing-target input image, and therefore, the brief spot color matching is not performed.

The RIP (Raster Image Processor) unit 603 generates image data in the raster format in the RGB color space (in the following, described as "RGB raster image data") based on the control command generated by the PDL analysis unit 601. At this time, in a case where the pixel having a specific color is included in the pixels constituting the input image, it is meant that the RGB values of the specific color have been replaced with the RGB values of the destination color by the above-described brief spot color matching.

The color matching unit 604 converts each of the pixel values in the RGB raster image data generated by the RIP unit 603 from RGB values into CMYK values by reading the color conversion LUT from the large-capacity storage device 104. By this color conversion processing, image data in the raster format represented in the CMYK color space (in the following, described as "CMYK raster image data") is generated.

The halftone processing unit 605 generates image data whose number of tones that can be processed by the printer engine 111 is reduced (halftone image data) by performing halftone processing for the CMYK raster image data generated by the color matching unit 604. As the halftone processing method, it is possible to apply various methods, such as the density pattern method, the systematic dither method, and the error diffusion method.

<GUI Control of Printer Driver>

Figure 7:
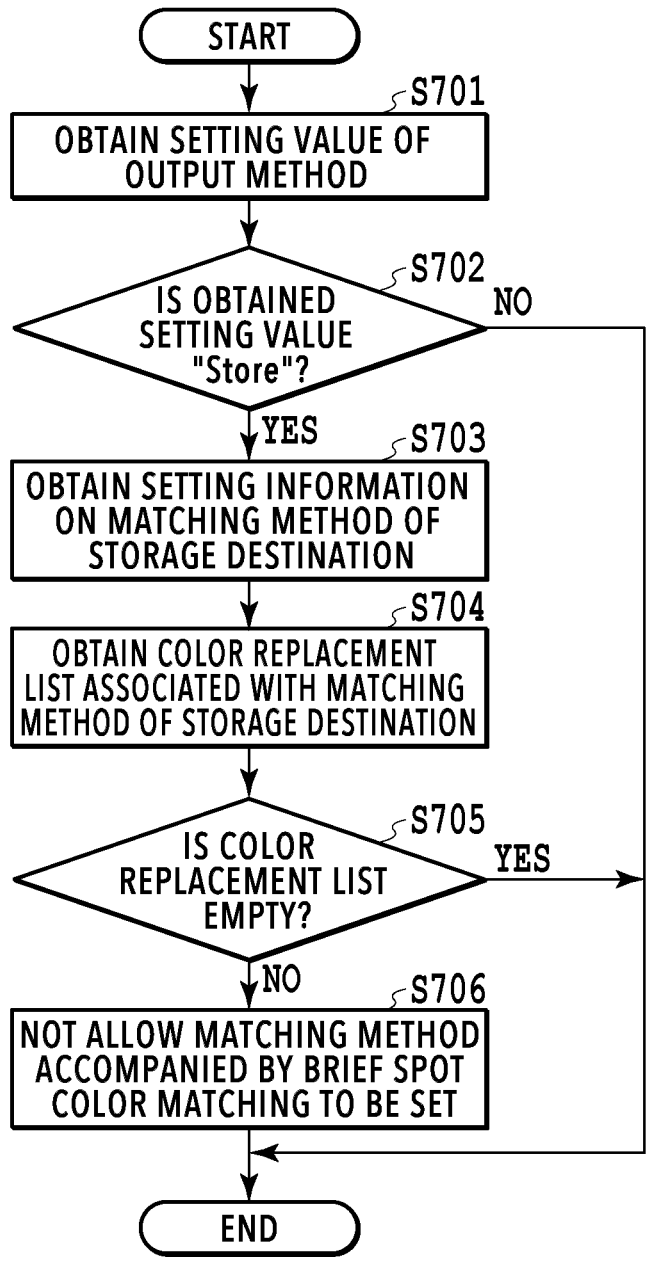
FIG. 7 is a flowchart showing a flow of GUI control of a printer driver.

Following the above, the operation of the GUI control unit 202 of the printer driver according to the present embodiment is explained with reference to the flowchart in FIG. 7. The series of processing in the flowchart in FIG. 7 is implemented by the CPU 121 of the host PC 120 reading a program stored in the large-capacity storage device 124 onto the RAM 123 and executing the program. Symbol "S" in the following explanation means a step.

First, at S701, the setting value of "Output Method" designated by a user via the GUI in FIG. 4A described previously is obtained. At next S702, the processing is branched in accordance with whether or not the setting value of "Output Method", which is obtained at S701, is "Store".

In a case where the setting value of "Output Method" is "Store", the processing advances to S703. On the other hand, in a case where the setting value is one (in the present embodiment, "Print", "Secure print", "Edit+preview") other than "Store", this processing is exited without performing the display control at S706, to be described later.

At S703, the setting information on the matching method in the external device (here, the MFP 100), which is the storage destination, is read and obtained from the large-capacity storage device 124. It is assumed that before this flow starts, for example, in the stage where the printer driver 200 is installed in the host PC 120, the information on the type of the matching method, which has already been set in the MFP 100, the storage destination, is obtained via the network 130 and stored in advance in the large-capacity storage device 124.

At next S704, the color replacement list associated with the type of the matching method (that is, the type of the matching method being set in the external device, the storage destination), which is specified by the setting information obtained at S703, is obtained. As described previously, in the present embodiment, with the four types of "General", "Monitor color reproduction", "Color difference minimum", and "VIVID photo", the color replacement list whose contents are empty is associated and with "LBP xxx color" and "POP print", the color replacement list in which the specific color and the destination color thereof are registered is associated. Consequently, in a case where the type of the matching method, which is set in the MFP 100, the storage destination, is one of "General", "Monitor color reproduction", "Color difference minimum", and "VIVID photo", the color replacement list whose contents are empty is obtained. Then, in a case where the type of the matching method, which is set in the MFP 100, is "LBP xxx color" or "POP print", the color replacement list in which the specific color and the destination color thereof are registered is obtained.

At next S705, the processing is branched in accordance with whether or not the contents of the color replacement list obtained at S704 are empty. In a case where the contents of the color replacement list are not empty (that is, at least one or more combinations of the specific color and the destination color thereof are registered), the processing advances to S706. On the other hand, in a case where the contents of the color replacement list are empty, this processing is exited without performing the display control at next S706.

At S706, part of the type selection is disabled on the GUI so that it is no longer possible to perform the setting of the specific matching method accompanied by the brief spot color matching. In a case of the present embodiment, among the alternatives of the type of "Matching Method" on the GUI in FIG. 5A described previously, "LBP xxx color" and "POP print" are gray-out displayed as shown in FIG. 5B. Due to this, it is no longer possible for a user to select the type of the specific matching method accompanied by the brief spot color matching.

The above is the contents of the display control of the GUI by the GUI control unit 202. In the present embodiment, the setting of the brief spot color matching is controlled indirectly via the type setting of the color matching method, but the present embodiment is not limited to this. For example, it may also be possible to control the setting of the brief spot color matching more directly by separately providing an independent item relating to the brief spot color matching in the operation setting on the GUI of the printer driver or in the MFP 100.

According to the present embodiment, in a case where storage instructions by the BOX function are given, it is no longer possible to set the type of the specific matching method accompanied by the brief spot color matching on the printer driver. As a result of that, the brief spot color matching is not performed for the image data that is stored by the BOX function, and therefore, the tint of the original image data is kept even in a case where the stored image data is transmitted to the host PC 120 or another printer thereafter.

Second Embodiment

In a case of the method of the first embodiment in which the setting of the matching method is limited on the side of the printer driver. the brief spot color matching is not performed for the image data that is stored by the BOX function. Because of this, in a case where it is scheduled to perform printing by performing the brief spot color matching, it is not possible for a user to store in advance the image data for the printing by utilizing the BOX function. Consequently, an aspect is explained as a second embodiment in which it is made possible to perform printing by applying the brief spot color matching to the image data stored by the BOX function. Explanation of the contents common to those of the first embodiment, such as the basic system configuration, is omitted and in the following, different points are explained mainly.

<Details of Image Processing Unit>

Figure 8:
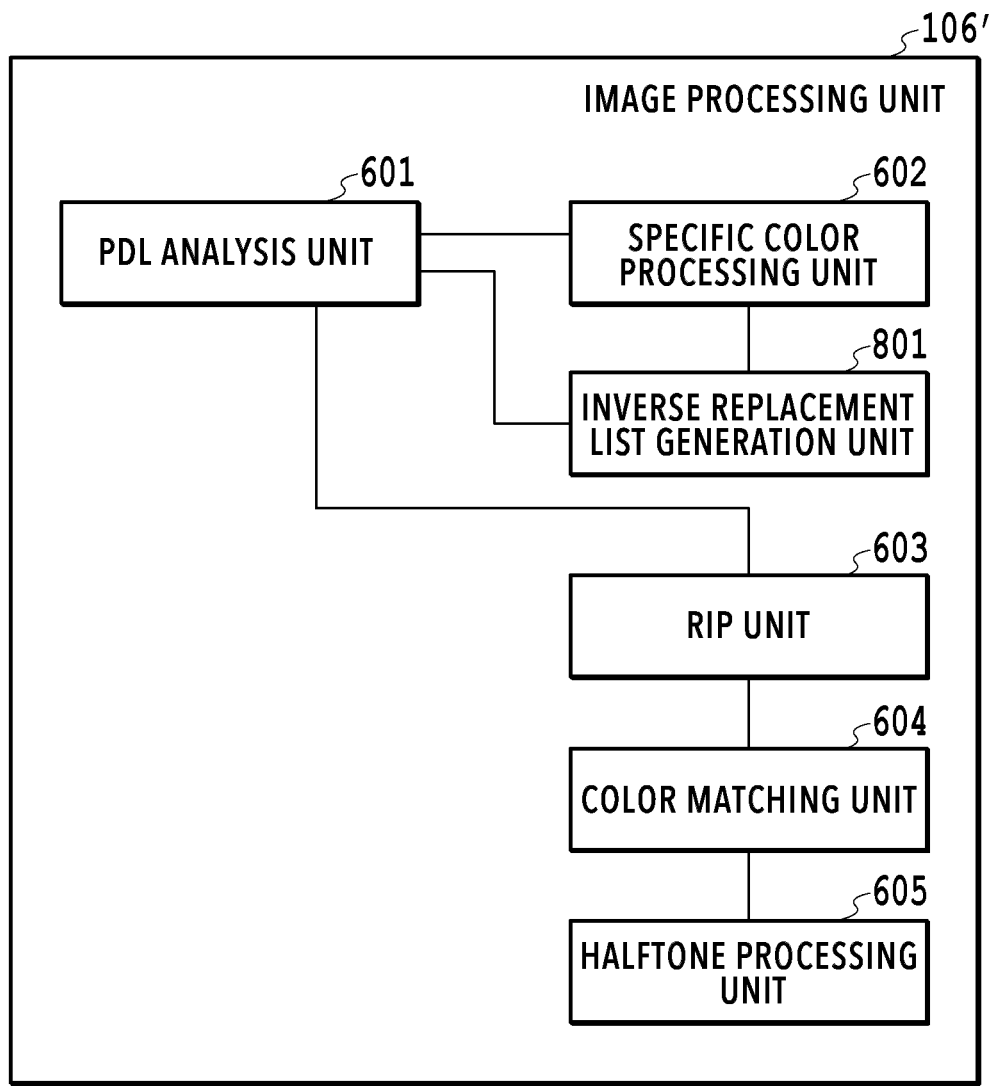
FIG. 8 is a block diagram showing an internal configuration of an image processing unit according to a second embodiment.

FIG. 8 is a function block diagram showing the internal configuration of an image processing unit 106' of the MFP 100 according to the present embodiment. The image processing unit 106' comprises an inverse replacement list generation unit 801, in addition to the PDL analysis unit 601, the specific color processing unit 602, the RIP unit 603, the color matching unit 604, and the halftone processing unit 605.

The inverse replacement list generation unit 801 generates an inverse replacement list in which the specific color and the destination color in the color replacement list described previously are exchanged in a case where the brief spot color matching is performed in the specific color processing unit 602. Each unit of the rest is the same as that of the first embodiment, and therefore, explanation is omitted.

<Processing of Input PDL Data>

Figure 9:
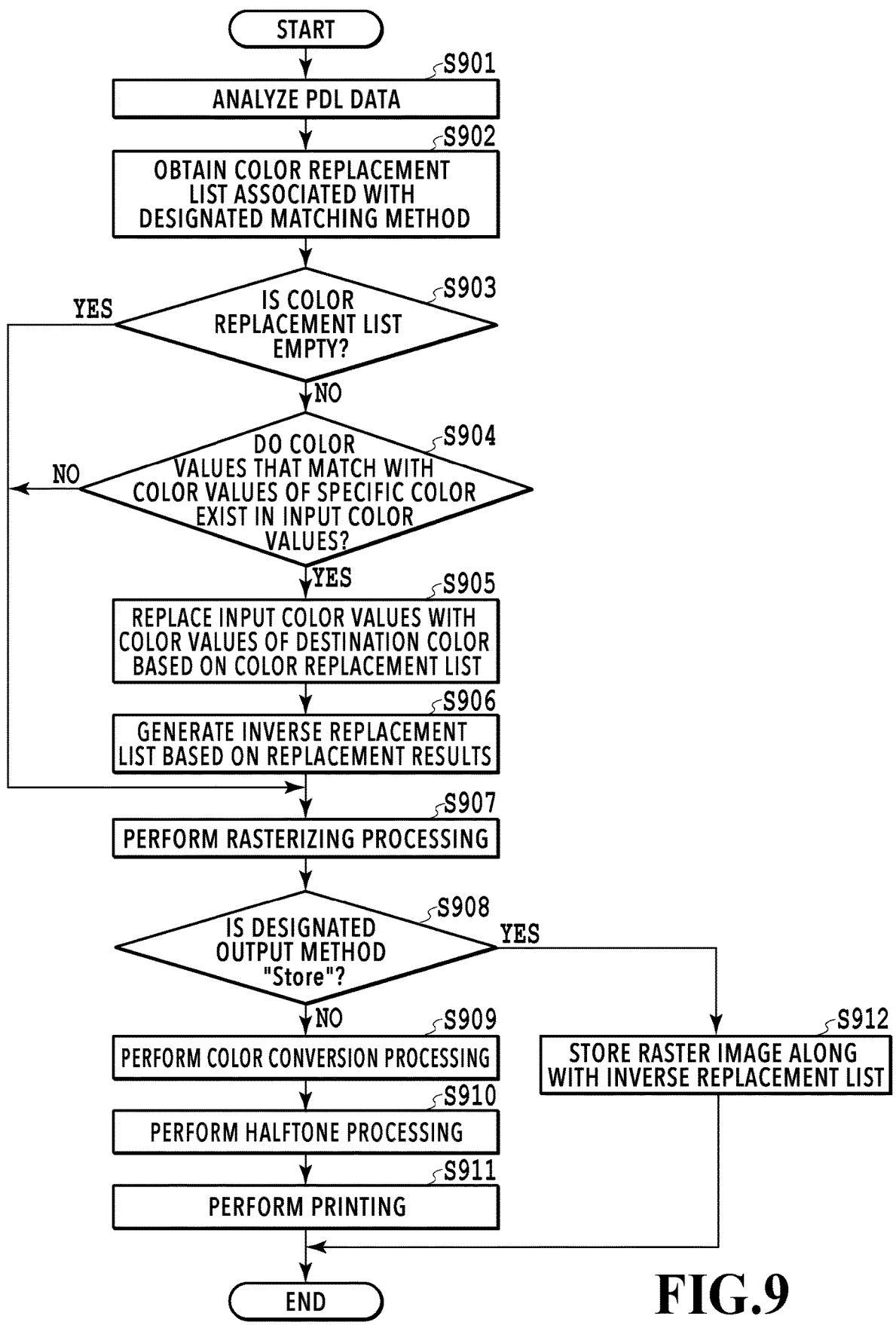
FIG. 9 is a flowchart showing a flow of processing in an MFP in a case where PDL data is input.

Following the above, the processing in the MFP 100 in a case where PDL data is input according to the present embodiment is explained with reference to the flowchart in FIG. 9. As the premise for the present embodiment, in the printer driver 200 of the host PC 120, the setting of the matching method explained in the first embodiment is not limited. That is, even in a case where a user designates "Store" as the output method, it is possible for the user to freely select any type relating to the setting of the matching method. Then, PDL data in accordance with the user instructions is generated and transmitted to the MFP 100. The series of processing shown in the flowchart in FIG. 9 is implemented by the CPU 101 of the MFP 100 reading a program stored in the large-capacity storage device 104 onto the RAM 103 and executing the program. Symbol "S" in the following explanation means a step.

In a case where PDL data is received from the host PC 120, at S901, the PDL analysis unit 601 analyzes the input PDL data. By this analysis, the setting information relating to "Output Method" and "Matching Method" designated by a user via the printer driver 200 and the information on the color values are obtained and further, a drawing command or the like for the RIP unit 603 is generated. As explained in the first embodiment, for example, in a case of the GUI in FIG. 4A described previously, it is possible to select the four kinds of "Print", "Secure print", "Store", and "Edit+preview" as "Output Method". In a case where any of these is selected as well, in the header portion of the PDL data, the setting information based on the user instructions about "Output Method" is included. Further, for example, in a case of the GUI in FIG. 5A described previously, it is possible to select the six kinds of "General", "Monitor color reproduction", "Color difference minimum", "VIVID photo", "LBP xxx color", and "POP print" as the type of "Matching Method". In a case where any type of these is selected as well, in the header portion of the PDL data, the setting information based on the user instructions about "Matching Method" is included. Then, in the data portion of the PLD data, the data of the drawing position and the color values of the drawing-target object is included for each page. The PDL analysis unit 601 reads and obtains the information from the input PDL data.

At next S902, the PDL analysis unit 601 obtains the color replacement list associated with the type of the matching method specified by the setting information on "Matching Method" obtained at S901. As in the first embodiment, it is assumed that with "LBP xxx color" and "POP print", the color replacement list in which the combination of the specific color and the destination color thereof is registered is associated, and with "General", "Monitor color reproduction", "Color difference minimum", and "VIVID photo", the empty color replacement list is associated. The color replacement list is sent to the specific color processing unit 602 along with the information on the input color values obtained by the analysis.

At S903, the processing is branched in accordance with whether or not the contents of the color replacement list are empty. In a case where the contents of the color replacement list are not empty (that is, at least one or more combinations of the specific color and the destination color thereof are registered), the processing advances to S904 and in a case where the contents of the color replacement list are empty, the processing advances to S907.

At S904, the specific color processing unit 602 compares the input color values obtained by analyzing the PDL and the color values of the specific color registered in the color replacement list obtained at S602 and determines whether or not the input color values and the color values of the specific color match with each other. In a case where determination results indicate that both match, the processing advances to S905 and in a case where both do not match, the processing advances to S907. For example, in a case where the input color values are (R, G, B)=(204, 0, 0) and (R, G, B)=(204, 0, 0) are stored also in the color replacement list as the color values of the specific color, both color values match, and therefore, the processing advances to S905.

At S905, the specific color processing unit 602 performs processing (color value replacement processing) to replace the input color values that match with the color values of the specific color with the color values of the corresponding destination color registered in the color replacement list. For example, it is assumed that (R, G, B)=(200, 0, 12) are registered in the color replacement list as the color values of the destination color corresponding to the color values (R, G, B)=(204, 0, 0) of the specific color. In this case, the input color values (R, G, B)=(204, 0, 0) are replaced with (R, G, B)=(200, 0, 12).

At next S906, the inverse replacement list generation unit 801 generates an inverse replacement list based on the results of the color value replacement processing at S905. Specifically, the inverse replacement list generation unit 801 generates a list in which the color values of the specific color, which are the target of the color value replacement processing, are taken as the color values of the "destination color" and the color values of the destination color, which are replaced by the color value replacement processing, are taken as the color values of the "specific color". For example, in the example described above, the input color values match with the specific color (R, G, B)=(204, 0, 0), and therefore, the input color values are replaced with the color values (R, G, B)=(200, 0, 12) of the corresponding destination color. In this case, the inverse replacement list as shown in Table 2 below is generated.

TABLE 2

| Specific color | | | Destination color | | |
|---|---|---|---|---|---|
| R | G | B | R | G | B |
| 200 | 0 | 12 | 204 | 0 | 0 |

At S907, the RIP unit 603 generates RGB raster image data by performing rasterizing processing in accordance with the drawing command received from the PDL analysis unit 601. The color values that are used at this time are the input color values in principle, but in a case where the color values are replace with others at S905, the replaced color values are used.

At S908, the processing is branched in accordance with whether or not the contents of the setting information on "Output Method", which is obtained by the PDL analysis at S901, are "Store". In a case of "Store", the processing advances to S912 and in a case where the contents are not "Store", the processing advances to S909.

At S909, the color matching unit 604 generates CMYK raster image data by performing color conversion processing based on the color conversion LUT for the RGB raster image data generated at S907. At next S910, the halftone processing unit 605 generates halftone image data by performing halftone processing for the CMYK raster image data generated at S909. The generated halftone image data is sent to the printer engine 111 via the engine I/F 107. Then, at S9111, the printer engine 111 performs printing processing by using the halftone image data.

On the other hand, at S912 in a case where the output method is "Store", the CPU 101 associates the RGB raster image data generated at S907 and the inverse replacement list generated at S906 with each other and stores them in the large-capacity storage device 104. In the present embodiment, the inverse replacement list is generated only in a case where the color value replacement processing has been performed and the inverse replacement list is associated at the time of storage, but it may also be possible to generate the inverse replacement list whose contents are empty and then store the RGB raster image data by associating the inverse replacement list therewith.

The above is the contents of the processing in the MFP 100 in a case where PDL data is input according to the present embodiment.

<Utilization of Image Data Stored by BOX Function>

Figure 10A:
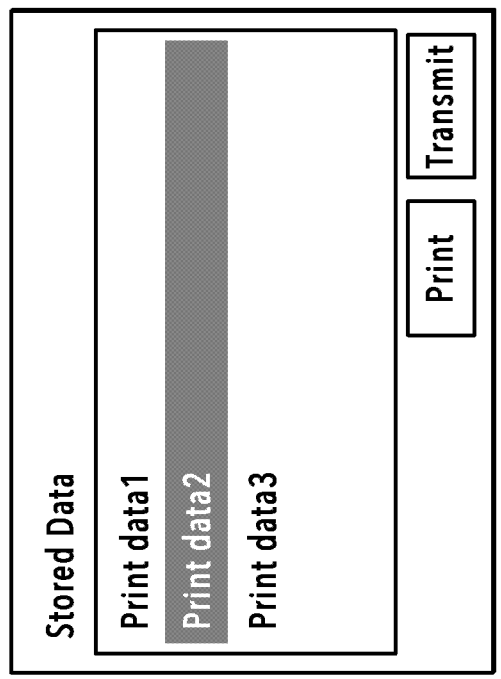
FIG. 10A and FIG. 10B are each a diagram showing an example of a GUI for utilizing stored data.
Figure 10B:
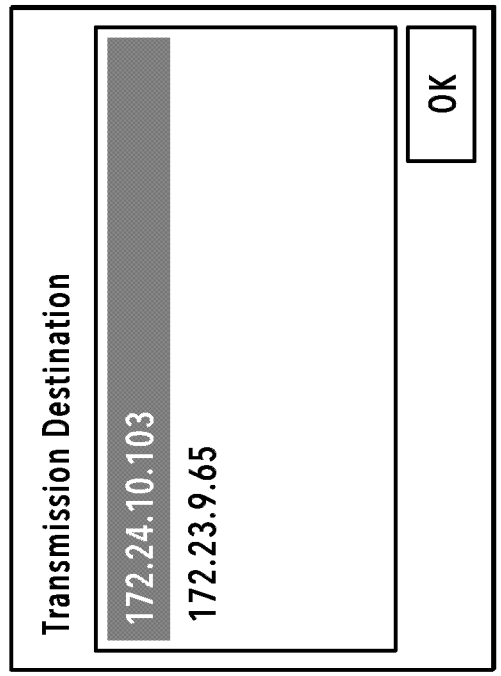

It is possible to utilize the image data stored at S912 described above (in the following, called "stored data") by performing printing in the MFP 100 by using the stored data or transmitting the stored data to an external device. FIG. 10A shows an example of a GUI for a user to utilize the stored data by the BOX function. On the GUI in FIG. 10A, the stored data is displayed in a list and a user selects arbitrary stored data from the list and then in a case of desiring to perform printing, the user presses down a "Print" button and in a case of desiring to transmit the stored data to an external device, the user presses down a "Transmit" button. In a case where the "Print" button is pressed down, printing processing is started. On the other hand, in a case where the "Transmit" button is pressed down, a GUI shown in FIG. 10B is further displayed. On the GUI in FIG. 10B, the IP addresses of transmission destination candidates are displayed in a list and in a case where the user selects an arbitrary transmission destination from the list and then presses down an "OK" button, transmission processing of the stored data selected on the GUI in FIG. 10A to the selected transmission destination is started.

Figure 11:
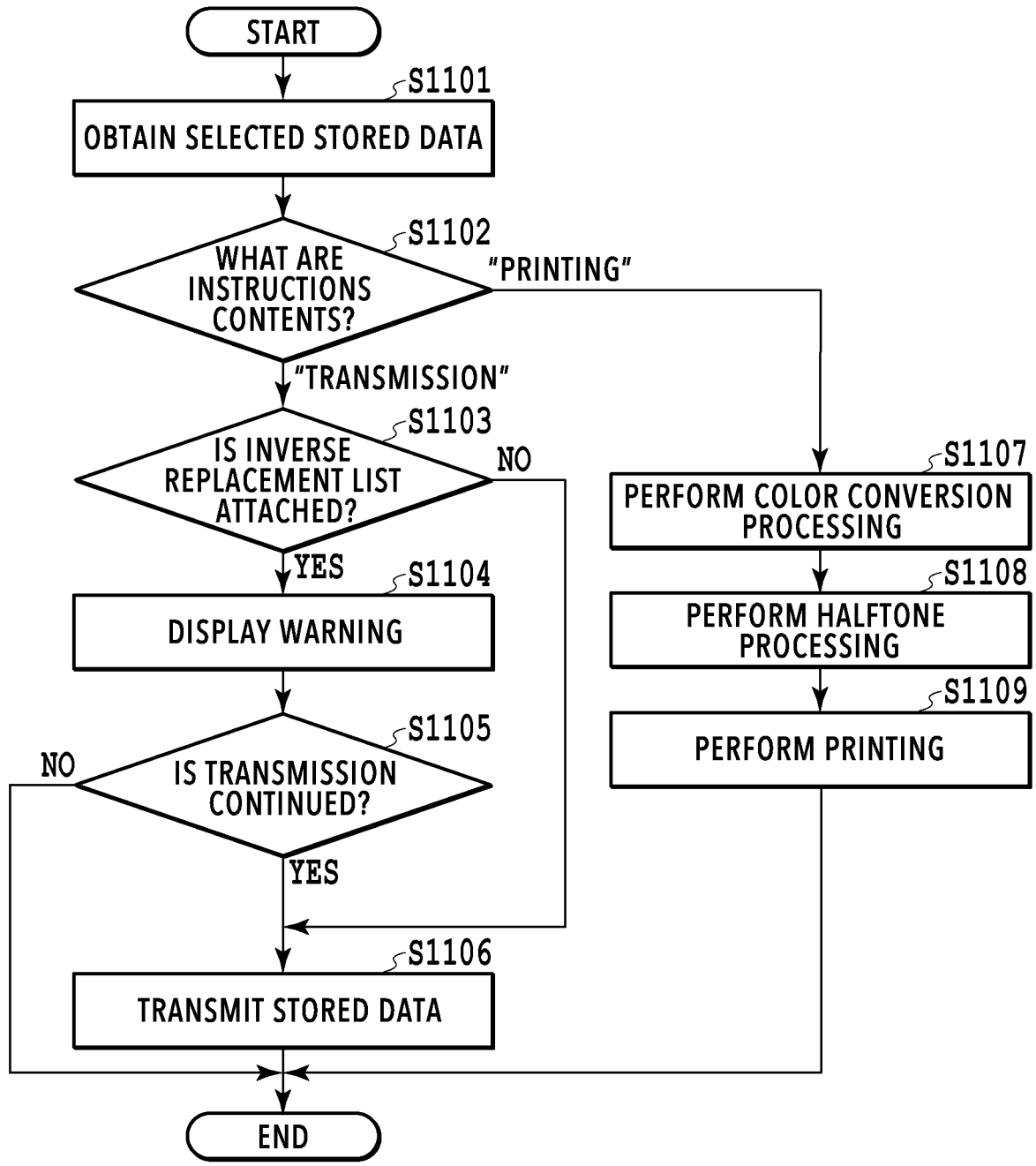
FIG. 11 is a flowchart showing a flow of processing in an MFP in a case where instructions to print or transmit store data are given.

FIG. 11 is a flowchart showing the flow of the processing in the MFP 100 in a case where instructions to perform printing or transmission are given by the above-described user operation. The series of processing shown in the flowchart in FIG. 11 is also implemented by the CPU 101 reading a program stored in the large-capacity storage device 104 onto the RAM 103 and executing the program. Symbol "S" in the following explanation means a step.

At S1101, the stored data selected by a user on the GUI in FIG. 10A described above is read and obtained from the large-capacity storage device 104. At next S1102, the processing is branched in accordance with the contents of the user instructions via the GUI in FIG. 10A described above. In a case where the user presses down the "Transmit" button, the processing advances to S1103 and in a case where the user presses down the "Print" button, the processing advances to S1107.

In a case where the stored data is transmitted, at S1103, the processing is branched in accordance with whether or not the inverse replacement list is associated with the stored data obtained at S1101. In a case where the inverse replacement list is associated, the processing advances to S1104 and in a case where the inverse replacement list is not associated, the processing advances to S1106. In a case where the inverse replacement list whose contents are empty is associated with the stored data as well, it is sufficient to perform the same processing.

At S1104, the CPU 101 displays a warning. Specifically, the CPU 101 displays a warning screen as shown in FIG. 12A on the display unit 105. In the example in FIG. 12A, a message indicating there is a risk that the tint will change at the transmission destination is displayed. Further, on the warning screen in FIG. 12A, an "OK" button in a case where transmission is continued and an "Abort" button in a case where transmission is cancelled are provided and it is made possible for a user to select one of them. At next S1105, the processing is branched in accordance with the instructions given by the user in response to the warning display described above. In a case where the user presses down the "OK" button on the warning screen in FIG. 12A, the processing advances to S1106 and in a case where the "Abort" button is pressed down, this processing is exited. Then, at S1106, the stored data obtained at S1101 is transmitted to the transmission destination designated by the user on the GUI in FIG. 10B via the network I/F 108.

Each piece of processing at S1107 to S1109 in a case where the stored data is printed corresponds to each piece of the processing at S909 to S911 in the flow in FIG. 9 described previously. That is, the color conversion processing and the halftone processing are performed in order for the stored data obtained at S1101 (S1107 and S1108) and the printing processing is performed (S1109).

The above is the flow of the processing in a case where the image data stored by the BOX function is printed or transmitted to an external device.

As above, in the present embodiment, no restriction is imposed at the time of storing the image data using the BOX function. Consequently, it is also possible to store the image data, which is scheduled to be printed by performing the brief spot color matching, by using the BOX function of the image forming apparatus that performs printing of the image data. Further, by issuing a warning at the time of transmitting the stored image data to an external device, it is possible to suppress in advance the occurrence of the risk that the accurate tint cannot be represented at the transmission destination.

Modification Example

In a case where transmission of stored data is selected and at least one or more combinations of a specific color and the destination color thereof are registered in an inverse replacement list, in the present embodiment, a warning is displayed at S1105 and a user is caused to determine whether or not to continue transmission processing. However, it may also be possible to perform control as described below. In the following, a modification example of the present embodiment is explained.

Modification Example 1

It may also be possible to perform control to immediately abort transmission processing by performing error display processing in place of the warning display processing (S1105) described previously. At this time, an error screen including a message indicating that it is not possible to perform transmission, for example, as shown in FIG. 12B, is displayed in place the warning screen in FIG. 12A.

In a case of the present modification example, the stored data for which the brief spot color matching has been performed is no longer transmitted to an external device, and therefore, such a problem that it is not possible to reproduce the tint of the original data in an external device at the transmission destination does not occur.

Modification Example 2

It may also be possible to transmit the color values of the pixel for which the color value replacement processing has been performed among the pixels constituting the transmission-target stored data after restoring the color values to the original color values by referring to the inverse replacement list. At this time, it is sufficient to attach a flag to the pixel whose color values have been replaced at the time of execution of the color value replacement processing. Due to this, it is possible to easily specify the pixel whose color values should be restored to the original color values. The color values are transmitted after being restored to the original color values, and therefore, the warning display processing (S1105) described previously is no longer necessary.

In a case of the present modification example, even though the stored data for which the brief spot color matching has been performed is transmitted to an external device, it is made possible to reproduce the tint of the original image data in the external device at the transmission destination. For example, even in a case where the stored data is transmitted to another printer and then printed therein, it is possible to reproduce the aimed tint by performing the brief spot color matching in the other printer. Further, even in a case where the stored data is transmitted to the host PC 120 and then browsed therein, it is possible to represent the stored data with the correct tint.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to improve convenience at the time of utilization of the BOX function for image data that is desired to be printed by performing the brief spot color matching.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-016502, filed Feb. 4, 2021 which is hereby incorporated by reference wherein in its entirety.

What is claimed is:

1. A non-transitory computer readable storage medium storing a printer driver for causing a computer to execute processes, the processes comprising:
    generating PDL data;
    outputting the generated PDL data;
    determining, on the basis that instructions to store the PDL data in an image forming apparatus capable of printing processing based on the PDL data are selected as a method of the output, not to allow setting of execution of replacement processing to replace a specific color with another color at the time of the printing processing for the PDL data to be generated in the generating; and
    determining, on the basis that instructions to print an image based on the PDL data are selected as the method of the output, to allow setting of execution the of replacement processing for the PDL data to be generated in the generating.

2. The storage medium according to claim 1, wherein the processes further comprising:
    determining not to allow setting of execution of the replacement processing for the PDL data to be generated in the generating in a case where performing the replacement processing at the time of the printing processing is set in the image forming apparatus.

3. The storage medium according to claim 2, wherein the processes further comprising:
    determining not to allow setting of execution of the replacement processing by not allowing execution of the replacement processing to be selected on a GUI for performing setting relating to the PDL data to be generated in the generating.

4. The storage medium according to claim 1, wherein the processes further comprising:
    determining not to allow setting of execution of the replacement processing for the PDL data to be generated in the generating by not allowing setting of the color matching method of the type, in a case where a type of the color matching method, which is set in the image forming apparatus, is a type accompanied by the replacement processing.

5. The storage medium according to claim 4, wherein the processes further comprising:
    determining not to allow the type accompanied by the replacement processing to be selected on a GUI for performing setting relating to the PDL data to be generated in the generating.

\* \* \* \* \*